Feb. 10, 1942. M. KLEIN ET AL 2,272,806
ILLUMINATING INDICATING INSTRUMENTS
Filed Nov. 29, 1938 2 Sheets-Sheet 2
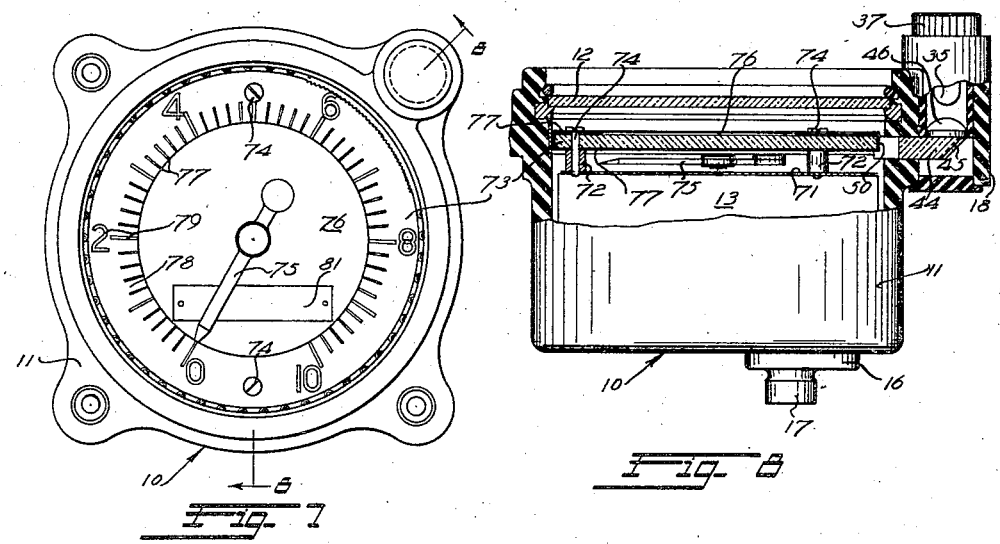
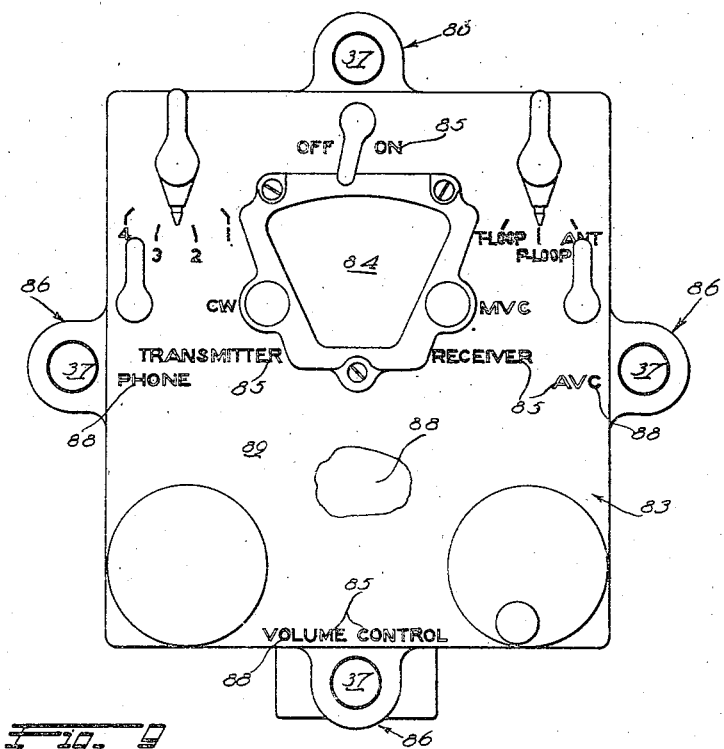
Inventor
Maximilian Klein
William E. Pfeffer
By Strauch & Hoffman
Attorneys Patented Feb. 10, 1942

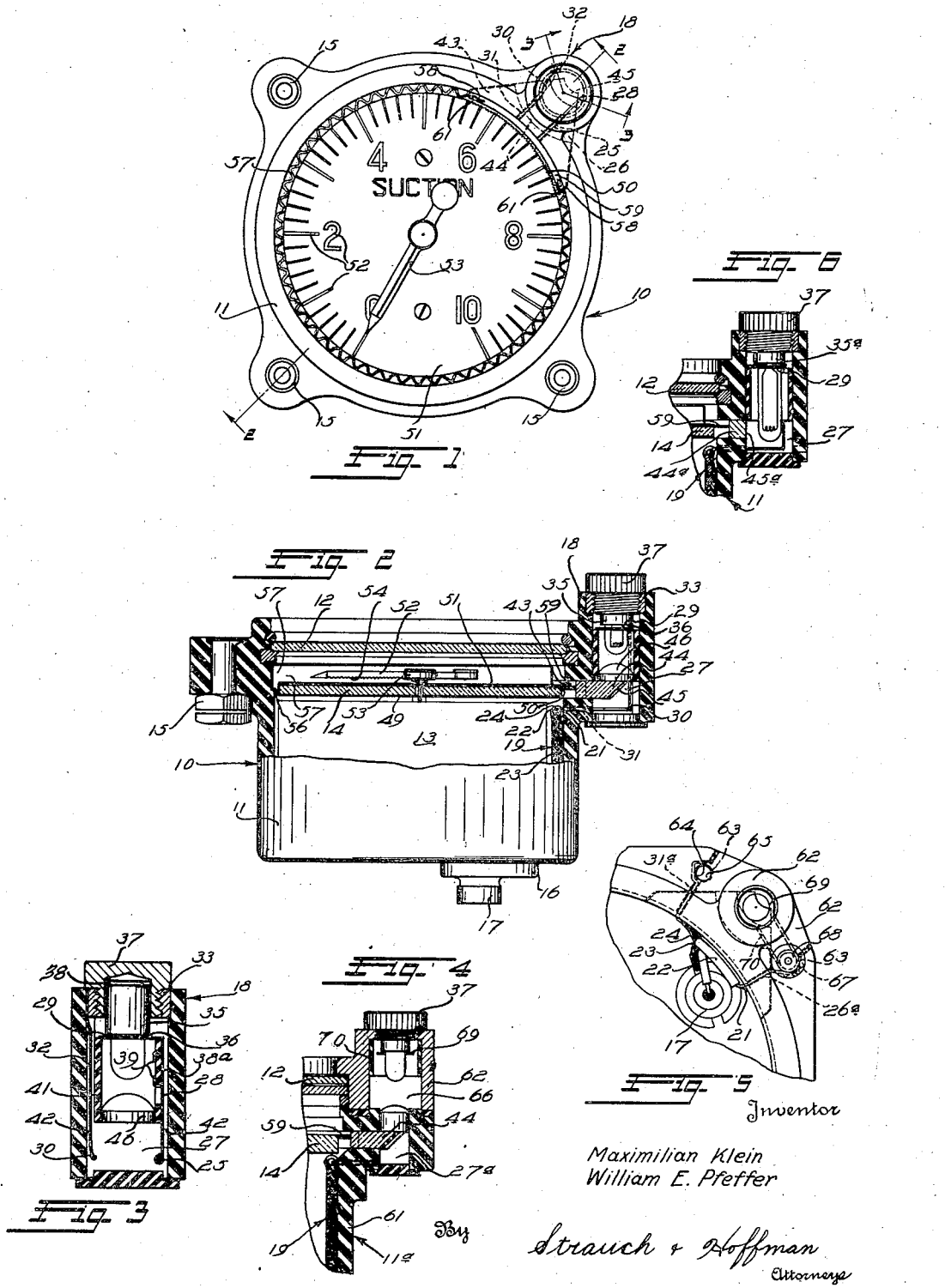

2,272,806

UNITED STATES PATENT OFFICE 2,272,806

ILLUMINATING INDICATING INSTRUMENTS

Maximilian Klein, Sellersville, and William E. Pfeffer, South Perkasie, Pa., assignors to United States Gauge Company, Sellersville, Pa., a corporation of Pennsylvania Application November 29, 1938, Serial No. 243,045

10 Claims. (Cl. 240—2.1)

The present invention relates to a novel system of illumination of individual instruments, and more particularly to a novel system for illuminating inscribed and decorated panels, dials and pointers of indicating instruments, clocks, and the like.

Indicating instruments, usually, are mounted on an instrument board in position to be viewed by an operator seated or otherwise stationed in front of the instrument board. It is often difficult from the operator's position to properly read such instruments at night due to improper lighting of the dial of the instrument principally because the instruments are lighted in a group or groups instead of individually. Furthermore, when such instruments are mounted, particularly in the dashboards of automobiles, aeroplanes and the like, it has been impossible to adequately illuminate the pointers moving over the dials so that a quick glance will enable a reading of the instrument though undesired glare is avoided.

Frequently, under present illumination practices, the light from the sources of illumination, when sufficient to adequately light the dials and pointers, casts undesirable shadows or glares in the eyes of the operator so that the view from his seat through the windshield is seriously impaired.

It is, accordingly, the primary object of the present invention to provide a novel system of illumination whereby the dial of an instrument is adequately illuminated while preventing undesired distribution of light in the region of the instrument.

A further object of the present invention resides in a system of indirect illumination of instruments wherein an indicia bearing element is illuminated by diffusing the light into the interior of the element and across the face of the element to flood the area in which the pointer moves without causing any substantial amount of light to be reflected from the instrument.

A further object of the present invention consists in passing the light from a suitable source of illumination through a lens that will rectify the divergent rays of light and direct them against the reflecting surface of a wedge-shaped prism to spread the reflected rays over a substantial area of the edge of the indicia bearing element to effect edge-illumination and/or over an arc parallel to and immediately adjacent a face of the indicia bearing element to effect edge-illumination and indirect lighting of a pointer or the like disposed in said area without causing shadows regardless of the position of the pointer or the like.

A still further object of the present invention resides in the provision of a light shield disposed between a source of light and the edge of the dial of an instrument to prevent the direct transmission of light to the exterior of the instrument and in the provision of optical devices to divide the rays of light into a plurality of parallel areas, one of which includes the indicia bearing element and the other of which is parallel to a face of the indicia bearing element and includes a reflecting member arranged to cause an even diffusion of light in every direction parallel to said face.

A further object of the present invention resides in so coating the surfaces of the indicia bearing element of an instrument that the light, diffused through the body of said element, illuminates merely the significant indicia on said element without reflecting any substantial amount of light from the instrument.

Another object of the present invention resides in coating selected portions of an indicia bearing element and associated pointer in such a manner that the readings may be made at night and glare eliminated.

Other objects will appear from this description and the appended claims when read in connection with the attached drawings wherein:

Figure 1 is a plan view of an instrument having a dial and pointer illuminated by the lighting system of the present invention, the cover glass and associated structure being removed for clarity of illustration;

Figure 2 is a transverse view in partial section taken on line 2—2 of Figure 1 and looking in the direction of the arrows;

Figure 3 is a fragmental sectional view taken on line 3—3 of Figure 1;

Figure 4 is a fragmental sectional view showing a modified mounting for the light source;

Figure 5 is a top plan view of the parts appearing in Figure 4;

Figure 6 is a fragmental sectional view illustrating a further modified form of the invention;

Figure 7 is a plan view similar to Figure 1 illustrating a further modified form of the invention.

Figure 8 is a partial sectional view taken on line 8—8 of Figure 7; and

Figure 9 illustrates the present invention applied to an indicia bearing panel, such as a radio control panel.

With continued reference to the drawings wherein like reference numerals are employed to designate the same parts throughout the several figures of the drawings, numeral 10 indicates generally an indicating instrument of any desired character such as a suction responsive gauge, a pressure gauge, a speedometer, a clock or the like.

Instrument 10 comprises a casing 11, preferably of "Bakelite" or the like having the usual cover-glass 12 and pointer actuation mechanism 13, indicated by a box-like member carrying a dial 14. The instrument may be provided with any suitable means, such as nuts 15, for mounting it on a supporting structure.

To adapt instrument 10 for the system of illumination provided by this invention, casing 11 is provided with a rearwardly extending boss 16 which is designed to receive a suitable electrical socket 17 for connection to a source of electrical energy, and a boss 18 forming a bulb-socket connected by a suitable electrical conduit 19 to socket 17.

Conduit 19 may take any desired form but preferably consists of an electric wire 21 having suitable insulation 22 therearound and encased by a flexible metal sheath 23. The end of conduit 19 remote from socket 17 has the sheathing 23 removed but not severed from the remainder of the sheathing. The exposed insulation 22 is removed from wire 21 up to a point an appreciable distance from the joined end of the uncovered portion 24 of sheathing 23. The bared end 25 of wire 21 is then passed through a suitable aperture 26 in the casing into bore 27 in boss 18 where it is connected to live conduit 28 which is provided with a concentric ring-shaped contact portion 29.

The portion 24 of sheathing 23 is soldered to one end of a conduit member 30 which passes through a suitable aperture 31 in casing 11 into bore 27 wherein it is connected to return conduit 32. Apertures 26 and 31 are preferably sealed by any suitable material in order to render the cases pressure tight and to secure the electrical conduits in place. Conduit 32 is suitably connected to an annular tapped contact ring 33 which serves as the ground or return contact.

A suitable miniature light bulb 35, is inserted into the socket of boss 18 and makes contact with live contact ring 29 carried by conduit 28 through contact member 36. A protecting cap 37 is screwed into contact ring 33 and completes the contact between ring 33 and contact 38 of bulb 35. Cap 37 also serves to retain bulb 35 in place under sufficient pressure to assure good electrical connections with the socket contacts. A more detailed disclosure of a bulb suitable for this purpose may be found by reference to the copending applications of Maximilian Klein and William E. Pfeffer entitled "Miniature bulb and socket construction" Serial Nos. 243,047 and 243,048 filed on even date herewith, now matured respectively into Patents No. 2,210,764 dated August 6, 1940, and No. 2,190,875 dated February 20, 1940.

Live conduit 28 intermediate contact ring 29 and its connection to wire 25 has an enlarged area 38a providing securing arms 39 designed to engage an insulating sleeve 41. Sleeve 41 snugly fits bore 27 and serves to maintain conduits 28 and 32 in their proper notches 42 and to locate ring 29 in its proper position. For a more detailed disclosure of the casing and wiring structure, reference may be made to copending application of Maximilian Klein and William E. Pfeffer entitled "Individually illuminated instrument casings" 243,046 filed on even date herewith wherein this structure is specifically claimed.

In the modification shown in Figures 1 to 3, casing 11 is provided with a wedge-shaped aperture 43, the upper edge of which coincides with the bottom of sleeve 41. The smaller end of the aperture intersects bore 27 while the larger end intersects the interior of the casing. A wedge-shaped prism 44 corresponding in shape to aperture 43 is disposed in the aperture with its smaller end protruding into and extending slightly more than half way across bore 27. Prism 44 is provided with an external reflecting surface 45. A suitable cement, such as "Glyptol" lacquer, secures prism 44 in place. Reflecting surface 45 is of arcuate shape in plan and slopes inwardly from top to bottom at an angle of 45° so that the light rays from bulb 35 will undergo total reflection and pass through prism 44 at right angles to the axis of bore 27.

To insure an evenly distributed reflection of the light rays from bulb 35, a bull's-eye lens 46 is secured by "Glyptol" lacquer in the lower end of sleeve 41 so as to rest upon the upper surface of prism 44. Lens 46 is so designed that the normally divergent light rays from bulb 35 will be reflected so as to leave the exit face of lens 46 in a direction paralleling the axis of bore 27.

To secure the highly efficient illumination of the indicia bearing element, as contemplated by this invention, the panel or dial 14 of the instruments of Figures 1 through 7 are manufactured and positioned in the following manner:

Dial 14 is made of a crystal clear substance, for example, "Plexiglas," which is an acrylic resin or "Lucite" which is a polymerized derivative of methacrylic acid. Either of these materials are available on the open market in sheet form.

The dial 14, or panel of desired configuration, is cut from a sheet of the material and suitably treated to provide an element having its rear surface and edges coated with a fairly heavy coating of white paint 49, except for a fluted portion 50 of the edge adjacent the exit face of prism 44. This portion 50 is left free of paint and is provided with vertically extending grooves or fluting. The face of the dial contains a relatively thin coat of white paint 49 and is printed over with a black ink to form an opaque coating 51 except in the area of the markings, figures, etc., which are left white. Certain of these white markings etc., may be then treated with radium 52 in the usual manner if desired.

The pointer 53 is also constructed of similar material. The indicating portion of pointer 53 is preferably of substantially triangular shape in cross-section with a flat face of the triangle serving as the underside. This face is provided along each longitudinal edge with a series of parallel, transverse grooves or flutings 54 and the upper surface is coated with a thin coat of white paint, and may be radium treated after the manner of the markings, etc., of the dial if desired.

For a more detailed disclosure of the panel or dial and pointer, references may be had to the copending application of Maximilian Klein and William E. Pfeffer entitled "Illuminable panel, dial and pointer structures" 243,044 filed on even date herewith wherein the dial and pointer are specifically claimed.

Casing 11 adjacent the dial 14 is provided with a shallow annular shoulder 56 which is designed to receive a corrugated metal reflector 57. Reflector 57 is preferably flexible, yet rigid enough to retain its position when placed on shoulder 56. The ends 58 of reflector 57 are fastened at points in alignment with the intersection of the side faces and the exit face of prism 44 by being hooked in the opposite ends of an opaque glare shield 59 as indicated by numerals 61. Glare shield 59 is in turn cemented to the exit face of prism 44 in alignment with the top surface of dial 14 and prevents direct rays of light from passing from the exit face past the edge of dial 14 to cause a glare. This shield also tends to divide the light emitted from prism 44 into two parallel planes, the lower of which enters dial 14 through the entrance area defined by the fluted portion 50, and the upper portion of which is diffused by the prism over the face of dial 14 to pointer 52 and reflector 57.

The illumination of the instrument of Figures 1 to 3 is accomplished in the following manner. Socket 17 is connected to a suitable source of electrical energy and through conduit 19 lights bulb 35 in boss 18. The normally divergent rays of light from bulb 35 pass into the bull's-eye lens 46 entering the lens through the convex face and emerging through the flat exit face as parallel rays. These rays passing through the portion of lens 46 overlying the protruding end of prism 44 enter prism 44. These last mentioned rays strike arcuate, total reflecting surface 45 and are bent at right angles and pass radially through prism 44. These radially travelling rays of light are divided into parallel horizontal areas by shield 59 and the lower area is projected on the fluted edge portions 50 of dial 14. The portion 50, being clear, permits the rays of light to enter the interior of the body of dial 14. Due to the vertical fluting of portion 50, the rays enter dial 14 in all directions and are diffused throughout the interior of dial 14.

These diffused rays of light pass through dial 14 and strike the exteriorly coated edges of the dial where each ray is partially reflected in a multiplicity of directions due to the concave reflecting surface provided by the coated edges of the dial. As a consequence, the dial body glows causing unusually vivid illumination of the white markings and figures due to the absorption of light by the white coating. The white coating on the edge rear surface and face of dial 14 further assures a glowing of the dial body since such coating absorbs a portion of the light rays. The intensity of illumination of the markings and figures on the face of the dial is further enhanced due to the fact that the radium coating absorbs the rays of light and due to the inherent characteristics of the radium material adds further light energy to the markings and figures.

The black coating 51 furnishes an opaque, dark background, causing the markings and figures to stand out in sharp contrast. As a consequence, the dial markings are vividly illuminated while undesired glare is eliminated due to the indirect nature of the light rays.

The upper area of rays passes above shield 59 and across the face of dial 14. Some of these rays strike pointer 53 and are absorbed by the surface coating while others strike the flutings 54 and are diffused throughout the body of the pointer in much the same manner as in the dial. Still other of the rays, passing across dial 14 strike corrugated reflector ring 57 and are reflected in every direction across dial 14 so as to flood the area above the face of the dial with indirect light to insure light rays for illuminating the pointer irrespective of its position with respect to the rays emerging from prism 44. The portion of prism 44 adjacent to and above shield 59 may be chamfered to further eliminate the glare and adjust the amount of illumination of pointer 53.

The radium coating on the dial markings and pointer also serves as an emergency or safety element should the bulb 35 fail while in service. In this connection, the radium, as is well known, will glow in the dark so that the instrument is readable, although not as readily as when the bulb 35 is operating.

In the modified form of the invention illustrated in Figure 4, the system of lighting is exactly the same as that disclosed in Figures 1 to 3. The only difference in this form of the invention is that a two part casing 11a is provided. Casing 11a consists of a main body portion 61 and a complementary metallic ring portion 62. The electrical connections in this form of the invention are identical to those described in Figures 1 to 3 up to the point where they enter bore 27a. At this point, conduits 25 and 30 are carried through apertures 26a and 31a (Figure 5) and around openings 63 formed in casing 11a. Ring 62 is provided with a complementary tapped opening 64. A suitable machine screw 65 pasing freely through one opening 63 threads into opening 64 and its head clamps conduit 30 in place to complete the return circuit from bulb 35 which is mounted in a bore 66. The return circuit is as follows: from bulb 35 through cap 37, metallic ring 62, screw 65, conduit 30 to sheathing 23.

Ring 62 is provided with an enlarged opening 67 complementary to the other opening 63 in casing 11a. A threaded metallic plug 68 is secured in opening 67 and insulated from ring 62. This plug connects with a conduit 69 which serves as the live contact for bulb 35 and is insulated from ring 62 by an insulating member 70. The system of lighting is like that heretofore described.

The modification shown in Figure 6 discloses a system of illumination wherein the bull's-eye lens is omitted and a prism 44a similar to prism 44 is used. Prism 44a is a wedge-shaped prism of the same general configuration as prism 44. The small end of prism 44a does not protrude into bore 27 but ends at the side wall. Face 45a is a vertical face forming a continuation of the wall of bore 27. Bulb 35a of this form of the invention is like bulb 35 except that it is longer so that the filament of the bulb is located directly opposite face 45a of prism 44a. As a result, light rays from bullb 35a diverge radially from the filament, which for all practical purposes serves as a point source of light at the center of face 45a. Due to this structure, the light rays pass through prism 44a in the same manner heretofore described and dial 14 and its associated pointer are similarly illuminated.

A further modification of the invention is disclosed in Figures 7 and 8. In this form of the invention, a casing 11 exactly like that of Figures 1 to 3 is used. As a consequence, the same reference numerals will be used and the detailed description of the casing omitted.

The pointer actuating mechanism 13 of this form of the invention is provided with a metal disk 71 having a dull black finish on its face. Suitable spacer sleeves 72 rest on disk 71 and support a "Plexiglas" dial 73 in spaced relation to disk 71. Elongated screws 74 pass through dial 73, sleeves 72 and disk 71 and are threaded into the framework of actuating mechanism 13 to effect a unitary assemblage of these parts. The pointer 75 of this form of the invention consists of a metallic pointer operating in the space between disk 71 and dial 73.

Dial 73 is made up with a perfectly clear central portion 76 and with a clear fluted edge portion 50, like the edge portion 50 of Figures 1 to 5. The edge, except portion 50, and the marginal portions of the front and rear surfaces of dial 73 are provided with a coating 77 of white paint, the marginal coating on the face of the dial being somewhat lighter than that on the edge and rear surface. The coated margin of the dial face is then printed with black ink 78 in the manner heretofore described, leaving the markings and figures white. Certain of these markings and the figures are then coated at 79 with radium as heretofore described.

Dial 73, constructed as pointed out above, is disposed on spacers 72 in such position that the top surface of the dial is in substantial alignment with the top surface of prism 44 and portion 51 is opposite the exit face of prism 44. As a consequence, the light rays from prism 44 pass through fluted edge portion 50 and below the rear surface of the dial. This passage of the light rays causes the body of the dial at the margins to glow as heretofore pointed out in connection with the dial of Figures 1 to 5 and the central portion 76 to appear as a lighted field through which the metallic pointer is viewed.

Since a portion of the light rays pass across the rear surface of dial 73, the area between disk 71 and dial 73 receives illumination in addition to that received from clear section 76 of the dial. As a consequence, the pointer 75 and any desired name plate or the like 81 on disk 71 may be read with facility. If desired, a reflector, like reflector 57 heretofore described, may be placed in casing 11a at the rear of dial 73.

While the present invention has been described in connection with dial and pointer instruments only, it is capable of use in many other environments. As an illustration of such a further use, the modification of Figure 9 is here presented.

In this form of the invention, a rectangular panel 83 of substantial size is illuminated by the system of the present invention. Panel 83 represents a radio control panel having a clear area 84 therein and provided with widely separated indicia 85. To effectively illuminate such a panel, it has been found desirable to utilize two or more light sources located at selected points.

Four light sources 86 located centrally on each side of the panel are shown in Figure 9 merely by way of illustration. Each light source contains a bulb, like that heretofore described, held in place by caps 37. These bulbs in turn are associated with spreading prisms 44 in any one of the several manners illustrated in Figures 1 to 7.

The panel 83 is coated, except for the fluted edge portions adjacent each prism and portion 84, with a primary coating 88 of white paint. The face or top surface is provided with an opaque coating 89 with the indicia exposed in white. Coating 89 may consist of black printing ink, decorative wood finishes or any desired substance having sufficient opacity. The several light bulbs when properly located will cause the body to glow uniformly and evenly illuminate the indicia at all points in the manner heretofore described in detail.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An indicating instrument comprising a casing, a dial, a pointer, a lamp mounted in said casing adjacent an edge portion of said dial, and means to cause said lamp to illuminate said dial and pointer, comprising a lens to parallel rays of light emitted from said lamp, a prism to disperse said light rays substantially evenly through the body of said dial and above said dial toward said pointer, and a reflector surrounding said pointer and reflecting light toward said pointer.

2. An indicating instrument comprising a casing, a smooth surfaced dial having a light transmitting body, a smooth translucent coating on said dial providing indicia outlined by an opaque covering on said coating, a source of light mounted in said casing adjacent an edge portion of said dial, a translucent pointer having a serrated under surface movable over said dial, and means to cause rays of light from said lamp to be substantially evenly distributed through the body of said dial and to be reflected on said surfaces of said pointer from substantially every direction to cause it to stand out against said opaque covering for said dial.

3. An indicating instrument, comprising a dial of translucent material, means to flood the body of said dial with light, a reflective coating on the back of said dial, a translucent coating and a superposed opaque coating on a portion of the front of said dial, the latter coating being interrupted to expose said translucent coating and thus provide indicia, a pointer movable over the front of said dial means to illuminate said indicia and pointer without causing shadows including a reflecting ring substantially surrounding said pointer and said dial and means to cause light rays to reach said ring in planes parallel to the surface of said dial.

4. An indicating instrument, comprising a dial of translucent material, a lamp disposed adjacent an edge of said dial, means to parallel certain of the rays of said light, means to cause a portion of said parallel rays of said lamp to be diffused substantially evenly through the body of said dial, means to cause the other of said parallel rays to enter the space in front of said dial only in planes parallel to said dial, a pointer in said space, means to reflect the light in said space toward said pointer, and means to cause said first named parallel rays to illuminate only the indicia of said dial whereby glare is minimized.

5. An optical system for use in an indicating instrument having a dial illuminated by a source of light mounted in the instrument casing adjacent the periphery of the dial, comprising a lens to parallel the light rays from said source of light and a prism to reflect said paralleled rays into the body of the dial substantially evenly, said prism having a curved reflecting surface and a curved light emitting surface of substantially equal angular length, said angle being sufficiently large so as to substantially include the width of the dial.

6. An individually lighted instrument, comprising a casing, a miniature lamp mounted in said casing, a dial of translucent material having a surface coated by a translucent coating and a superposed opaque covering applied to portions of said translucent coating so as to outline translucent indicia, a pointer movable over said dial, and a lens and a prism interposed between said lamp and the edge of said dial and the space in which said pointer moves to parallel and distribute the rays of said lamp substantially evenly throughout the body of said dial and into said space in planes parallel to the dial, and a reflector substantially surrounding the pointer and dial to illuminate the pointer from every side thereof to avoid shadows.

7. An illuminated indicating instrument, comprising a dial having translucent indicia, means to illuminate said instrument, a pointer movable over the dial, a reflector ring substantially surrounding said pointer and said dial, and means between said dial and said illuminating means to direct light from said illuminating means into the body of the dial and into the space surrounding said pointer to illuminate said ring and pointer in planes parallel to the dial, whereby the instrument is lighted without glare and without causing the pointer to cast shadows.

8. An indicating instrument comprising a dial having a light transmitting body and a smooth substantially plane face; translucent indicia on said face and an opaque covering on said face outlining said indicia; a translucent indicator element movable over said dial with said covering as a background; a light source, and means adjacent an edge of said body for dispersing a part of the light from said source into the interior of said body whereby said indicia are illuminated, said means also being constructed and arranged so as to direct light rays in a plane parallel to said dial and in the plane of said indicator element.

9. An indicating instrument, comprising a transparent dial having translucent indicia outlined by an opaque covering; a translucent pointer spaced from and movable over said dial in a plane parallel therewith, said pointer having a polygonal cross-section with one face parallel to the plane of said dial and provided with a number of serrations; a light source adjacent an edge of said dial; means for paralleling a portion of the light rays from said source and for distributing said paralleled rays in the plane of said dial and in the plane of said spaced pointer, whereby said translucent indicia and said pointer are clearly illuminated.

10. An indicating instrument comprising a casing, a dial mounted in said casing having a light transmitting body, a pointer movable over said dial, said pointer being shaped to present reflecting surfaces, a lamp disposed in said casing adjacent an edge of the dial, means to parallel certain rays of said lamp, means to disperse some of said paralleled rays of light through the body of said dial and other of said rays into the plane of the pointer, and a substantially cylindrical reflector substantially surrounding said pointer and dial to reflect light rays onto the dial and into the plane of the pointer.

MAXIMILIAN KLEIN.
WILLIAM E. PFEFFER.